Patented June 15, 1948

2,443,247

UNITED STATES PATENT OFFICE 2,443,247

PRODUCTION OF POLYALKYL BENZENES

William C. Howell, Jr., Elizabeth, N. J., assignor to Standard Oil Development Company, a corporation of Delaware No Drawing. Application August 26, 1943, Serial No. 500,165

11 Claims. (Cl. 260—671)

1

The present invention is concerned with the production of condensation products wherein alkyl benzenes are condensed with alkylating agents of low molecular weight in the presence of Friedel-Crafts type catalysts. The invention is further concerned with carrying out such a reaction under such reaction conditions as to obtain a combined and perhaps simultaneous alkylation and isomerization reaction.

It has previously been found that the polyalkyl benzenes such as, for example, the xylenes, may be treated with methyl alcohol or methyl chloride in the presence of such Friedel-Crafts type catalysts as aluminum chloride under a wide range of reaction temperatures to produce the corresponding tri-alkyl benzenes. These reactions, however, have been characterized by a direct addition of a methyl group to the aromatic nucleus, the orientation of the methyl group so introduced being somewhat determined by the amount of catalyst present and the temperature under which the reaction is carried out. In all cases, however, the methyl group is simply added on to the benzene ring by replacing a hydrogen atom connected to a nuclear hydrocarbon atom.

It has now been discovered that by the proper correlation of reaction conditions, amount of catalyst and a suitable selection of feed stocks, it is possible to not only introduce alkyl groups, such as the methyl group, into a polyalkyl benzene, for example a xylene, but that in addition it is possible to effect during that reaction an isomerization of one or more of the alkyl groups already present in the compound so undergoing reaction. In order to illustrate, it has been found that if ortho xylene, which is also known as 1,2 dimethyl benzene, is alkylated with methyl alcohol or methyl chloride in the presence of aluminum chloride under proper reaction conditions and using the proper quantity of catalyst, the resulting compound predominates in 1,3,5 trimethyl benzene (mesitylene). In other words, instead of obtaining 1,2,3 trimethyl benzene or 1,2,4 trimethyl benzene, as would be expected in methylating ortho xylene according to the processes heretofore known, it has now been discovered that the reaction can be made to undergo not only a condensation in methylating the xylene compound but likewise a shift of one of the methyl groups already in the reactant material occurs so that the resulting product contains practically no 1,2,3 trimethyl benzene or 1,2,4 trimethyl benzene but is in reality predominantly 1,3,5 trimethyl benzene, sometimes referred to as mesitylene.

The feed stock undergoing reaction is prefer-

2 ably a dialkyl benzene and may be, for exapmle, one of the following substances or mixtures of these substances in which any one or more of the following predominates: ortho xylene, para xylene, 2-ethyl toluene, 4-ethyl toluene, 1,2, diethyl benzene, 1,4 diethyl benzene, 2 n-propyl toluene, 4 n-propyl toluene, 2 isopropyl toluene, 4 isopropyl toluene, and similar ortho and/or para di-lower alkyl benzenes. Suitable and convenient sources of raw materials for use in the present process are, (1) the ortho xylene concentrate or (2) the $C_9$ aromatics fraction obtained in the catalytic hydroforming of petroleum fractions. This same general type of feed stock is also obtainable from selected fractions obtained in coal tar distillation. The ortho xylene may be easily isolated from the hydroformed product by efficient fractional distillation, as may the $C_9$ aromatics fraction which usually contains substantial amounts of orthodialkyl aromatics. The process of the present invention finds its greatest utility in the treatment of the ortho derivatives, although as previously pointed out, para dialkyl aromatics of the benzene series are likewise within the scope of the invention.

The alkylating agent may be selected from a number of specific substances. If a methylating agent is desired, suitable reactants are methyl chloride, methyl bromide, methyl alcohol and the like. If it is desired to nuclearly substitute higher alkyl radicals on the dialkyl benzenes, ethylene, ethyl chloride, ethyl bromide, ethyl alcohol and similar higher alkyl homologues may be employed. The invention is not limited to the use of any particular alkylating agent but the invention in its preferred embodiment contemplates the use of methyl alcohol, methyl chloride or methyl bromide.

The catalyst employed is preferably aluminum chloride, although aluminum bromide or any other Friedel-Crafts type catalyst may be used. The catalyst may be employed in finely divided solid form. It may be impregnated on a suitable carrier such as Porocel or any partially dehydrated bauxite, activated alumina, charcoal, adsorptive clay such as bentonite, and the like. The amount of catalyst that is generally present ranges in the case of aluminum chloride, between about 50 and 250 weight per cent based on the amount of dialkyl benzene employed  Preferably, the amount of aluminum chloride present is between about 100 and 175 weight per cent. Other catalysts such as boron trifluoride, hydrogen fluoride and ortho phosphoric acid deposited on a carrier such as kieselguhr may also be employed.

The ratio of the reactants may vary somewhat but in general, and preferably if it is desired to introduce into the benzene nucleus a single lower alkyl group, approximately equal molar portions of the dialkyl benzene and the alkylating agent are employed. If desired, however, a molar excess of the dialkyl benzene of the order of 2:1 or 3:1 may be employed with good results.

The time of contact and reaction temperature are interrelated. In general, a reaction temperature range between about 40° C. and about 160° C. is maintained, with the preferred range being between about 80° C. and 120° C. Coupled with these ranges, the reaction time may be determined by suitable spot tests and it has been found that with the lower temperatures a time of contact between about 2 and 5 hours is desirable while with the higher temperatures the time of contact may vary between about 1 and 3 hours.

The temperature employed and the time of contact are also dependent to a large extent upon whether or not a promoter is likewise present. The present invention contemplates the use of not only a Friedel-Crafts type catalyst alone as the activating agent for carrying out the reaction but also a halogen-containing promoter, among which may be mentioned hydrogen chloride, hydrogen bromide, hydrogen fluoride, chloroform, carbon tetrachloride, chlorine and bromine. These are employed to expedite the reaction and will result in a shortening of the contact period required to reach a substantial production of the desired final product. In general, the amount of promoter employed is relatively small, usually of the order of between about 0.5 and about 12 weight per cent of promoter based on the dialkyl benzene reactant.

The product of the reaction, upon fractional distillation, may be separated into its component parts and there may be segregated therefrom a product of over 98% purity in some cases. In other instances, the operation is not so efficient but one of the chief uses of the final products obtained by the process of the present invention lies in their usefulness as blending agents and additives to aviation gasolines to improve their performance characteristics. In such instances, it is not always necessary that the 1,3,5 trialkyl benzenes be segregated from the lesser amounts of the other products of the reaction since the entire mixture may be employed as obtained or roughly separated into $C_8$, $C_9$ and $C_{10}$ fractions and employed as desired, that is, without the segregation of the individual components of the reaction product.

The following example is typical and illustrative of one specific embodiment of the invention, but it is not intended that the invention be limited thereto.

Example

To about 1065 grams of anhydrous aluminum chloride in a closed reaction vessel (vented to the atmosphere through a calcium chloride drying tube) was admixed about 174 grams of an ortho xylene concentrate (85 weight per cent ortho xylene, 7 weight per cent meta xylene, 8 weight per cent non-aromatic hydrocarbons). The resulting admixture was cooled to about 10–15° C. and agitated and to it a mixture of about 289 grams of ortho xylene concentrate and about 128 grams of absolute methyl alcohol was added slowly over a period of approximately 1½ hours. The temperature was then raised to between about 95° C. and 110° C. and the total mixture allowed to react at this temperature for approximately 3 hours. At the substantial completion of the reaction, the hydrocarbon was separated from the catalyst and subjected to an analytical distillation using a column having about 80 theoretical plates and with a flux ratio of about 18:1. The products of the reaction and the amounts thereof were as follows:

| Cut Nos. | Total Vol. per cent Off | Reflux Temp., °F. | Principal Product Obtained |
|---|---|---|---|
| 1–9 | 17.7 | 178–278 | Benzene-Toluene. |
| 10–12 | 24.2 | 278–288 | 2.5 Wt. per cent Ethyl Benzene. 8.0 Wt. per cent Para Xylene. 78.0 Wt. per cent Meta Xylene. 11.5 Wt. per cent Ortho Xylene. |
| 13–16 | 31.1 | 288–327.5 | Mesitylene (Impure). |
| 17–43 | 82.5 | 328.5 | Mesitylene (98+% Pure). |
| 44–47 | 87.5 | 329–335 | Mesitylene+Other $C_9$ Alkyl Aryls. |
| 48–52 | 91.5 | 335–392 | High Boiling Aromatics. |
| Residue | 100 | | |

From ultraviolet analyses of each of the cuts or fractions obtained, it was determined that about 58.5 weight per cent of mesitylene was produced, or, based on the ortho xylene employed, about 45.5 weight per cent of the total product constituted mesitylene, also known as 1,3,5 trimethyl benzene.

Having thus described and illustrated the nature of the invention, what is desired to be secured by Letters Patent is:

1. A method of producing 1,3,5 trimethyl benzene which comprises reacting a feed stock comprising essentially 1,2 dimethyl benzene with methyl alcohol, wherein the molar ratio of 1,2-dimethyl benzene to methyl alcohol is within the range of from 1:1 to 3:1, in the presence of about 50–250% by weight of aluminum chloride based on dimethyl benzene at a temperature of between about 80° C. and about 120° C. for about three hours.

2. A process as in claim 1 wherein promotional amounts of hydrogen chloride are employed.

3. A process which comprises reacting a $C_8$ dialkyl aromatic hydrocarbon fraction predominating in ortho-substituted constituents with a methylating agent, wherein the molar ratio of ortho-substituted constituents to methylating agent is within the range of from 1:1 to 3:1, in the presence of about 50% to 250% by weight based on the hydrocarbon of a Friedel-Crafts type catalyst at a temperature between 80° C. and about 120° C. for 2 to 5 hours to produce predominantly 1,3,5 dialkyl methyl benzenes to the practical exclusion of 1,2,3- and 1,2,4-dialkyl methyl benzenes.

4. A process as in claim 3 wherein a halogen-containing promoter is employed.

5. A process for the production of mesitylene which comprises reacting a feed stock comprising essentially ortho xylene with a methylating agent selected from the group consisting of methyl alcohol, methyl chloride and methyl bromide wherein the molar ratio of ortho xylene to the methylating agent is at least 1:1, in the presence of between about 50% and about 250% by weight based on ortho xylene of an aluminum halide selected from the group consisting of aluminum chloride and aluminum bromide while under a temperature of between about 40° C. and about 160° C. for about 2-5 hours.

6. A process as in claim 5 wherein the reaction is carried out in the presence of between about 0.5% and about 12% by weight of the ortho xylene of a halogen-containing promoter selected from the group consisting of hydrogen chloride, hydrogen bromide, hydrogen fluoride, chloroform, carbon tetrachloride, chlorine and bromine.

7. A process for the production of 1,3,5 trialkyl benzenes which comprises reacting a feed stock comprising essentially ortho dialkyl benzenes with an alkylating agent, wherein the molar ratio of ortho dialkyl benzenes to alkylating agent is at least 1:1, in the presence of a Friedel-Crafts type catalyst at a temperature between 80° C. and about 120° C. for 2 to 5 hours.

8. A process as in claim 7 wherein the reactants are ortho xylene and methyl chloride.

9. A process as in claim 7 wherein the reactants are ortho xylene and methyl alcohol.

10. A process as in claim 7 wherein the reactants are para xylene and methyl chloride.

11. A process for the production of mesitylene which comprises mixing about 1 part by weight of ortho-xylene with about 2-3 parts by weight of anhydrous aluminum chloride and about ⅓ part by weight of absolute methyl alcohol at a temperature of about 10-15° C., raising the temperature of the mixture to about 95-110° C., reacting the mixture at about 95-110° C. for about three hours, separating the hydrocarbons from the aluminum chloride and distilling the hydrocarbons to recover the mesitylene formed.

WILLIAM C. HOWELL, JR.

REFERENCES CITED

The following references are of record in the file of this patent:

Thomas, "Anhydrous Aluminum Chloride in Organic Chemistry," Reinhold 1941, pages 80-85, 717-18. (Copy in Div. 31.)

Norris et al., J. A. C. S., 61, 2131-4 (1939); Chem. Abs., 33, 7748 (1939). (Patent Office Library.)

Nightingale et al., J. A. C. S., 63, 3514-17 (1941); Chem. Abs., 36, 1020 (1942). (Patent Office Library.)